United States Patent [19]

Borodin

[11] Patent Number: 4,527,446
[45] Date of Patent: Jul. 9, 1985

[54] CAM-ACTUATED ROBOTIC MANIPULATOR SYSTEM

[75] Inventor: Daniel J. Borodin, Sterling Heights, Mich.

[73] Assignee: U.S. Automation Company, Detroit, Mich.

[21] Appl. No.: 362,539

[22] Filed: Mar. 26, 1982

[51] Int. Cl.$^3$ ............... B25J 11/00; F16H 25/16; F16H 35/08
[52] U.S. Cl. ............... 74/828; 74/54; 74/469; 414/732; 414/733; 901/21
[58] Field of Search ............ 74/25, 469, 96, 519, 74/579 R, 54, 828; 414/680, 729, 730, 732, 733, 1, 2, 4, 706, 707, 709; 901/21

[56] References Cited

U.S. PATENT DOCUMENTS

| | | |
|---|---|---|
| 2,989,229 | 6/1961 | Barbeau .................. 74/25 |
| 2,990,720 | 7/1961 | Scholtes ................. 74/96 |
| 3,166,272 | 1/1965 | Liddell et al. ........... 74/469 |
| 3,247,979 | 4/1966 | Melton et al. ............ 414/4 |
| 3,580,099 | 5/1971 | Mosher ................... 74/469 |
| 3,750,490 | 8/1973 | Fisher ................... 414/733 |
| 3,758,365 | 9/1973 | Schilling ................ 414/729 |
| 3,867,845 | 2/1975 | Antuma ................... 74/25 |
| 3,889,552 | 6/1975 | McGough, Jr. ............. 74/519 |
| 3,974,880 | 8/1976 | Filan et al. ............. 414/680 |
| 4,111,317 | 9/1978 | Robinson ................. 414/680 |
| 4,153,240 | 5/1979 | Gouley ................... 414/729 |
| 4,297,908 | 11/1981 | Zimmer .................. 74/469 |
| 4,329,110 | 5/1982 | Schmid .................. 414/730 |
| 4,329,111 | 5/1982 | Schmid .................. 414/733 |

FOREIGN PATENT DOCUMENTS

| | | |
|---|---|---|
| 0010476 | 4/1980 | European Pat. Off. ........ 74/519 |
| 2723180 | 12/1977 | Fed. Rep. of Germany ..... 414/1 |
| 8200630 | 3/1982 | Int'l Pat. Inst. ......... 414/733 |

Primary Examiner—Allan D. Herrmann
Attorney, Agent, or Firm—Barnes, Kisselle, Raisch, Choate, Whittemore & Hulbert

[57] ABSTRACT

A cam-actuated robotic manipulator system comprising an articulated robot arm adapted for multiple degrees of angular motion, and an actuator system which includes series-connected four-bar linkages and a cam input mechanism for controlling each degree of motion of the robot arm. The several series-connected four-bar linkages for each degree of motion share at least some common axes of rotation, one of which is position-variable for adjusting output position of the corresponding manipulator arm segment for a given cam input. The input mechanism to each four-bar linkage arrangement comprises conjugate cams and conjugate cam followers having an overload mechanism connected therebetween to detect obstruction to movement of the corresponding arm segment for disengaging the cam drive mechanism, and thereby preventing damage to the robot manipulator arm and actuator.

20 Claims, 23 Drawing Figures

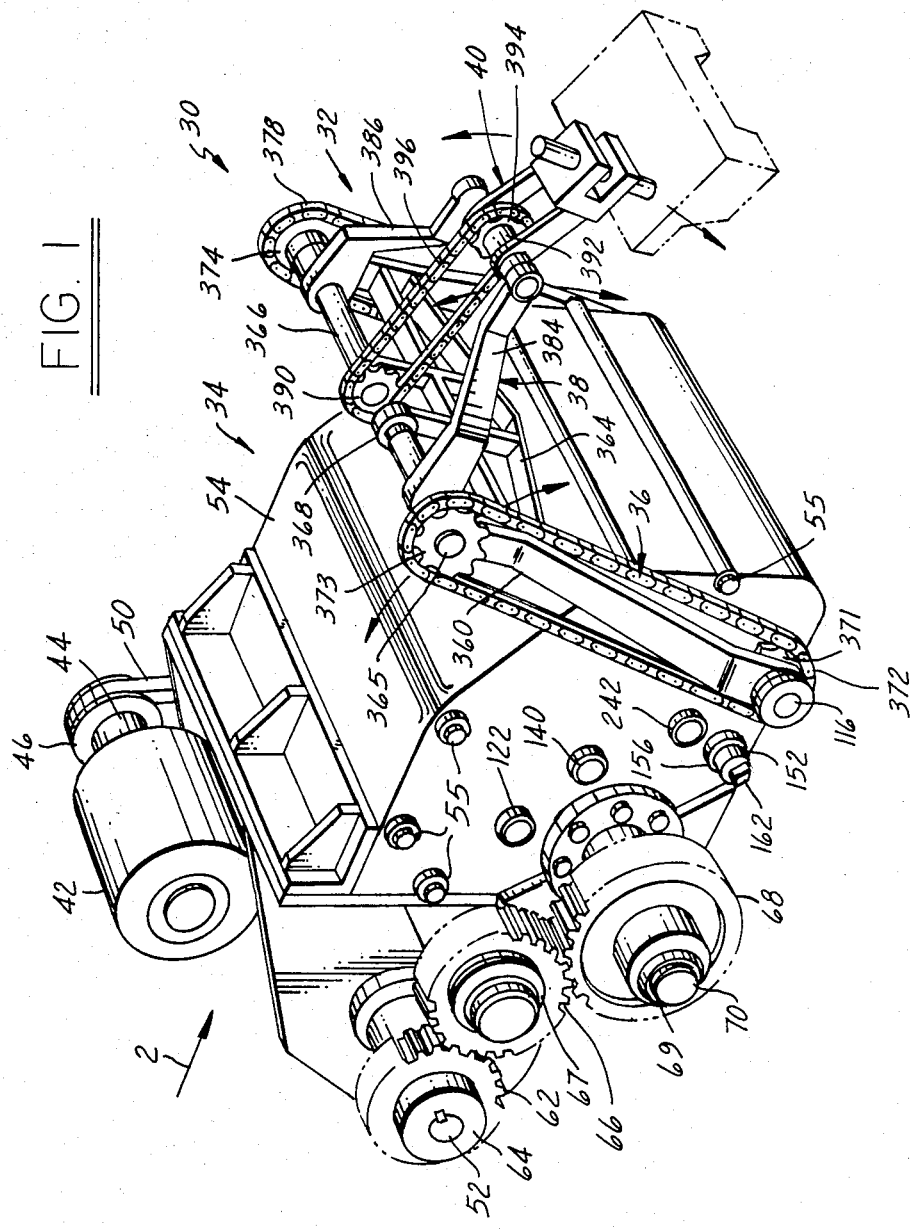

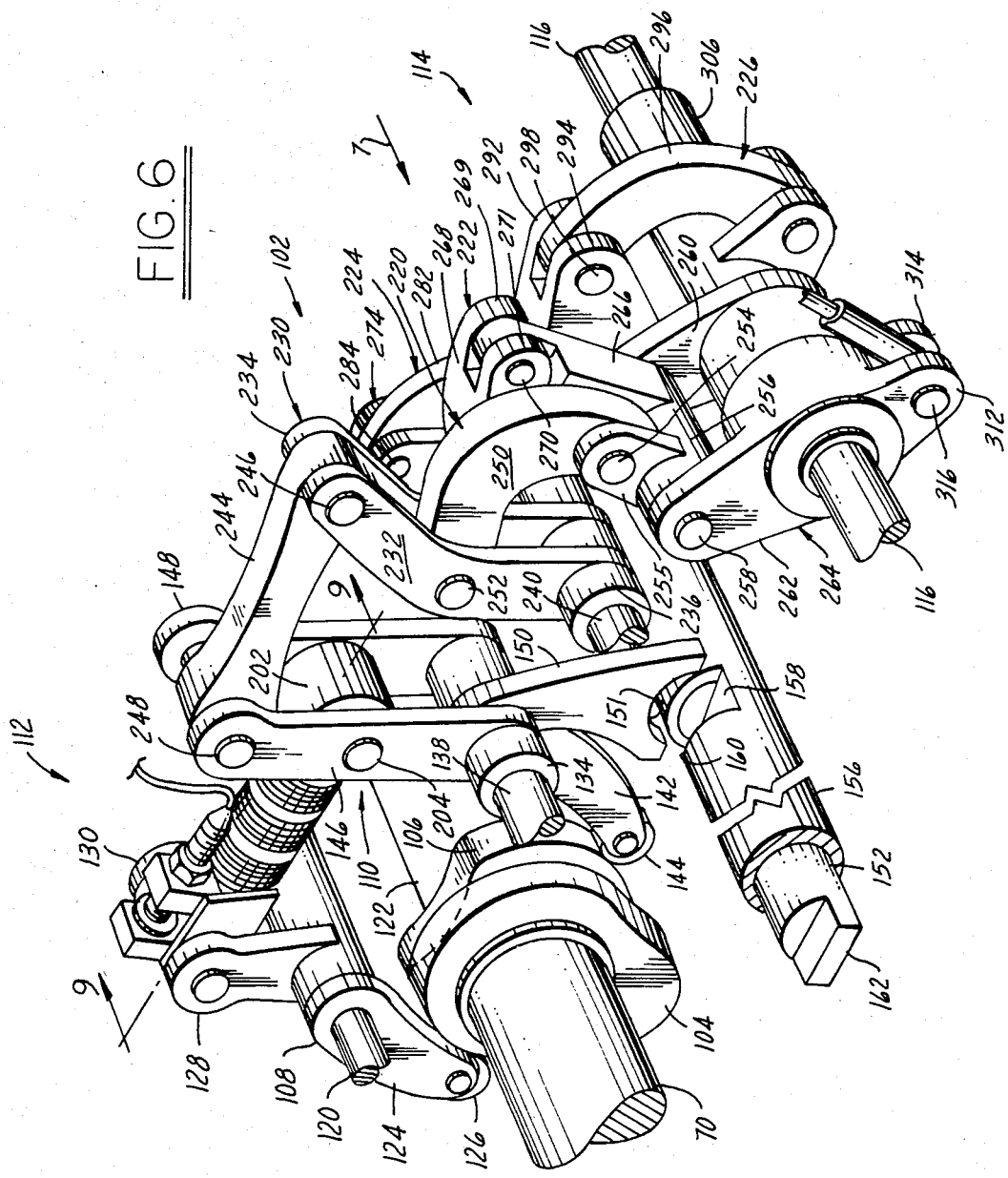

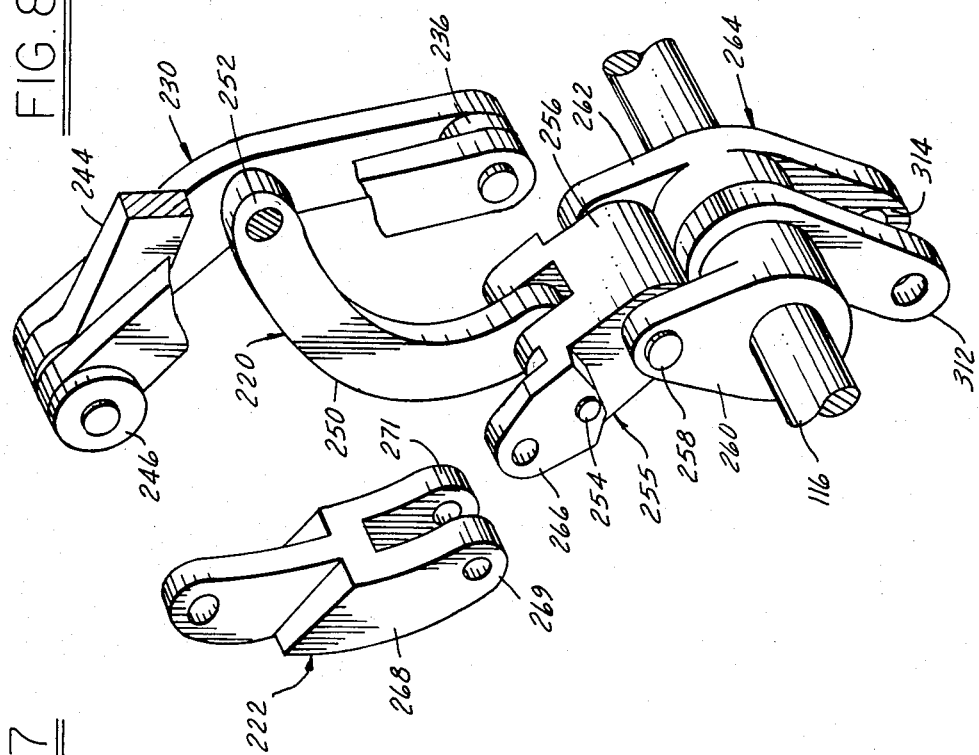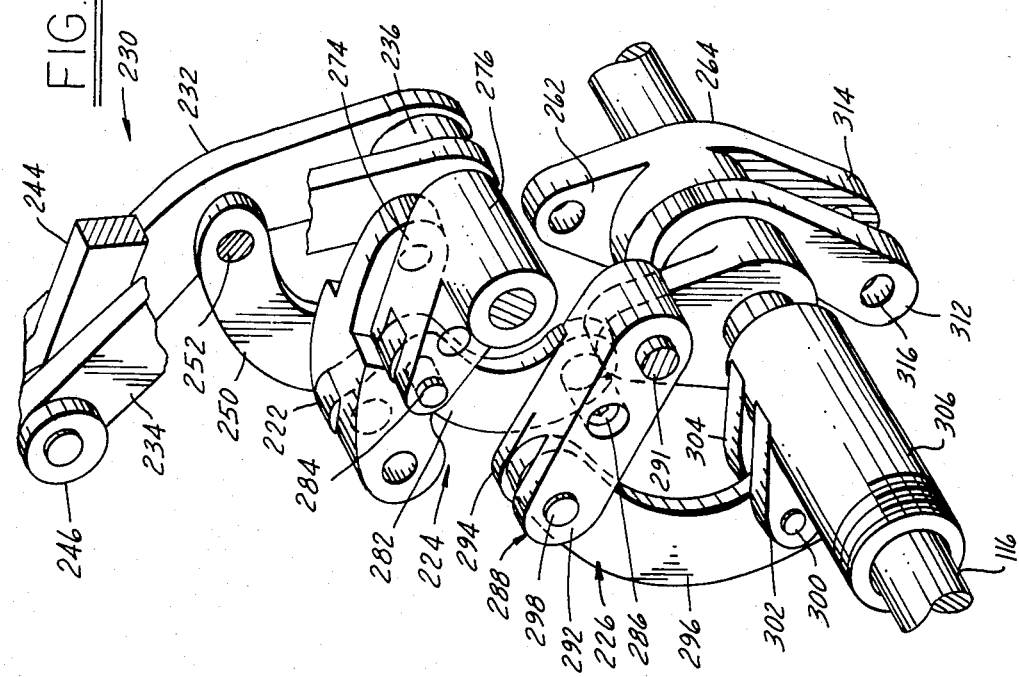

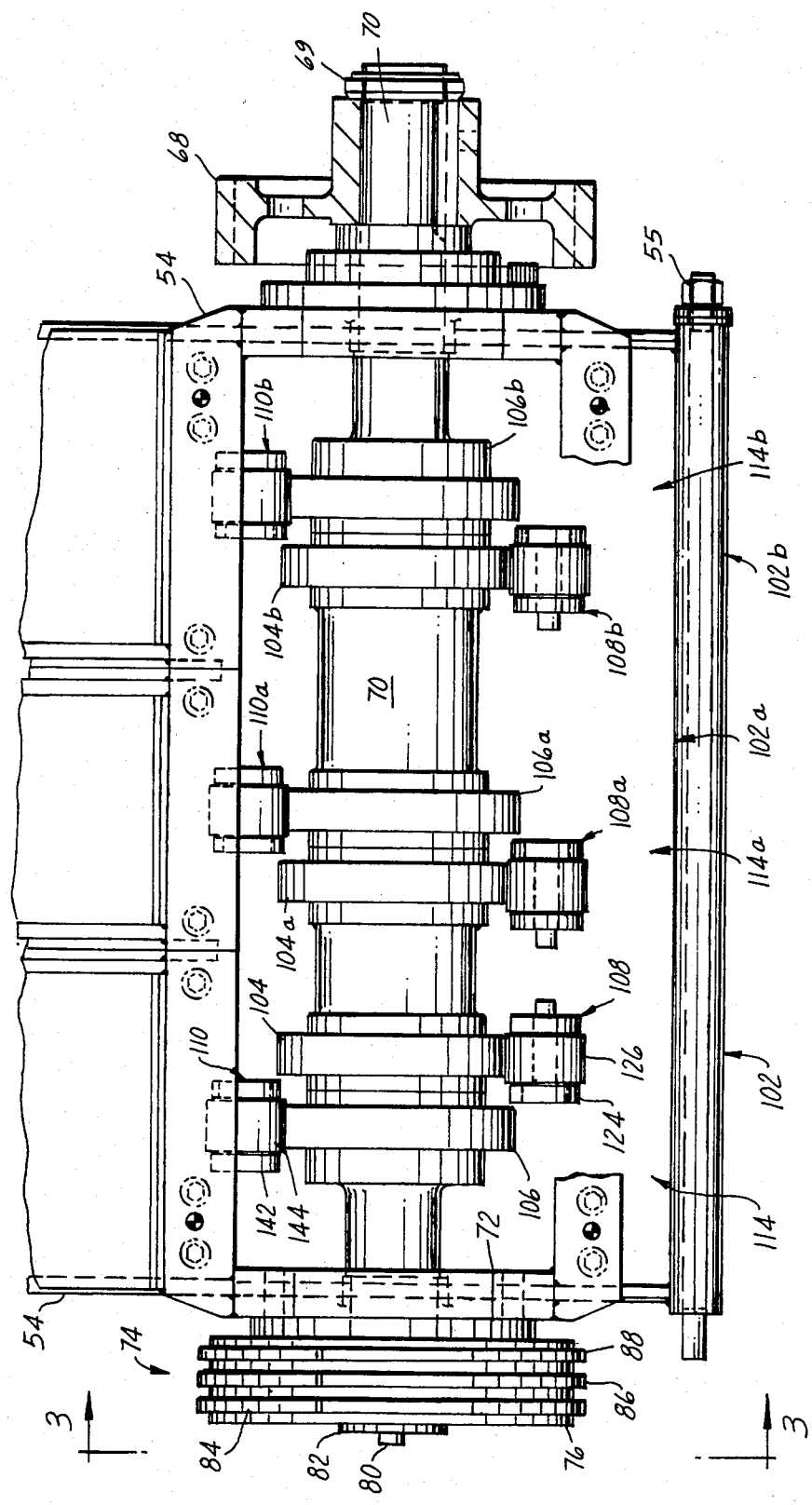

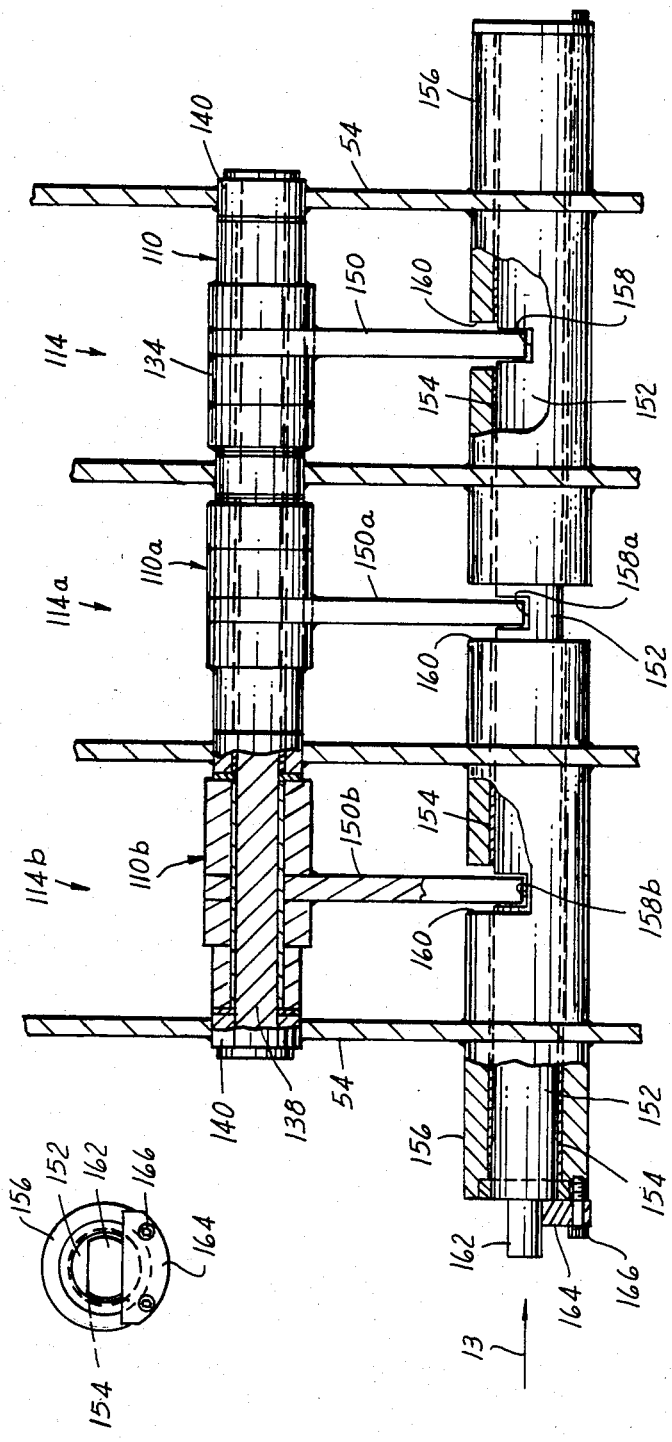

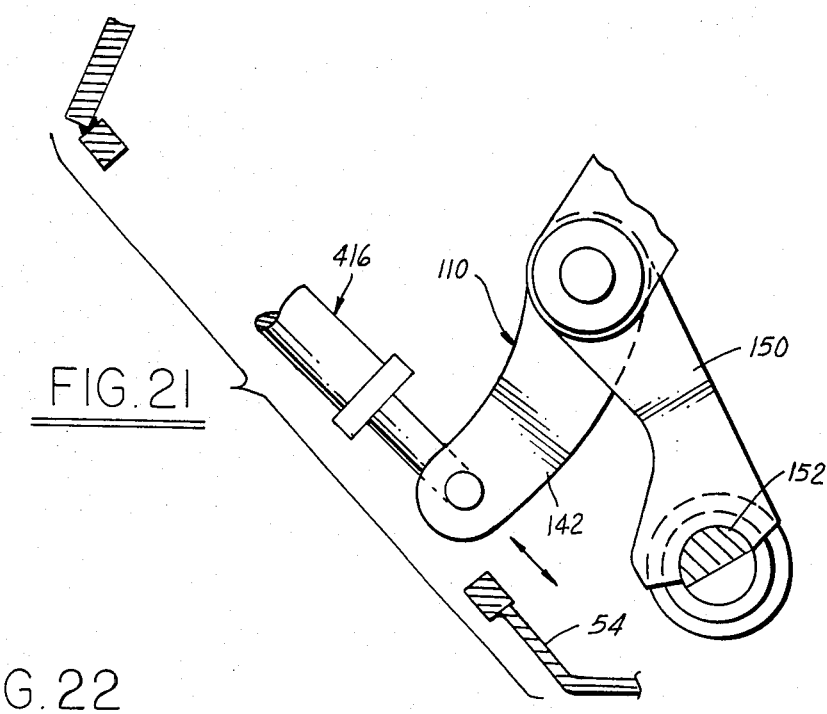
FIG. 21
FIG. 22
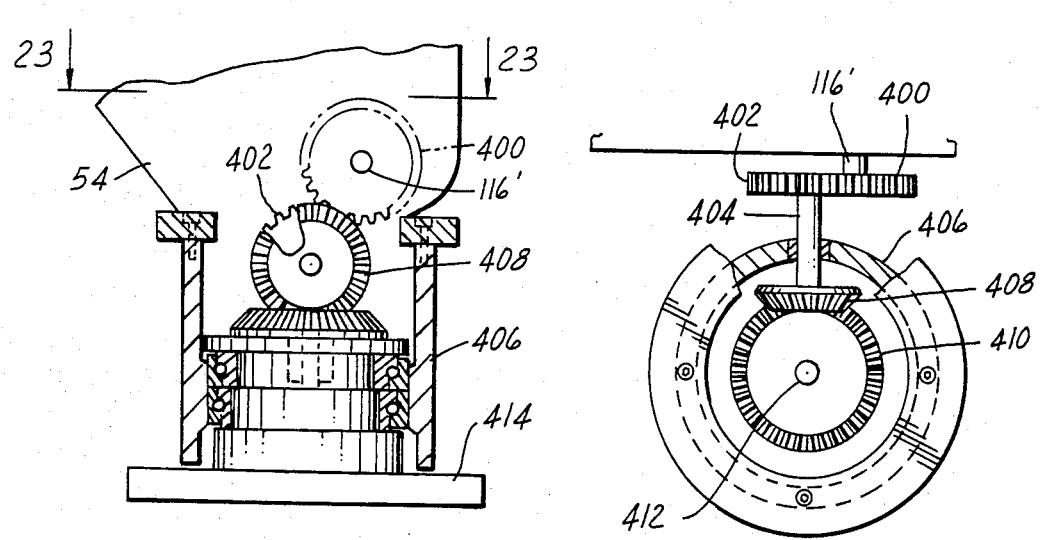
FIG. 23

CAM-ACTUATED ROBOTIC MANIPULATOR SYSTEM

The present invention is directed to robotic manipulators, and more particularly to robotic systems of the type which comprise a manipulator arm and a programmable arm actuating mechanism for controlling articulation of one or more arm segments through a continuous path of movement.

A general object of the present invention is to provide a continuous path robotic manipulator system of the described type wherein continuous electronic monitoring and control of arm motion, as by programmed digital computers responsive to position, velocity and acceleration transducers or the like mounted on the manipulator arm and characteristic of the prior art, is eliminated.

In furtherance of the foregoing, a more specific object of the invention is to provide a continuous path robotic manipulator wherein motion of the manipulator arm segments is effected and controlled by mechanical means, preferably a rotating cam. Another and related object of the invention is to provide a manipulator arm actuating mechanism which amplifies an input mechanical movement, such as rotation of a cam, and correspondingly controls movement of a manipulator arm section independently of movement of the remaining manipulator arm sections and associated actuating mechanisms.

Another object of the invention is to provide a robotic manipulator and actuating mechanism as previously described which may be readily programmed or reprogrammed in the field.

A further object of the invention is to provide a mechanical actuating mechanism for a robotic manipulator which is economical in assembly and reliable in use over an extended operating lifetime.

Yet another object of the invention is to provide a cam-actuated robotic manipulator system which includes means for sensing obstruction of the manipulator arm and terminating or suspending operation of the actuator mechanism to prevent damage to the manipulator arm and/or the actuating mechanism.

Yet another object of the invention is to provide an improved robotic manipulator arm.

The invention, together with additional objects, features and advantages thereof, will be best understood from the following description, the appended claims and the accompanying drawings in which:

FIG. 1 is a perspective view of a cam-actuated robotic manipulator system in accordance with a preferred embodiment of the present invention;

FIG. 6 is a perspective view of the actuating mechanism illustrated in FIG. 5;

FIG. 7 is a fragmentary perspective view similar to FIG. 6 showing the actuating mechanism in the direction of arrow 7 in FIG. 6;

FIG. 8 is a fragmentary partially exploded perspective view similar to FIG. 7 and showing a portion of the actuating mechanism;

FIGS. 10–12 are sectional views taken substantially along the respective lines 10—10, 11—11 and 12—12 in FIG. 5;

FIG. 13 is a side elevational view taken in the direction of arrow 13 in FIG. 12;

FIG. 21 is a fragmentary elevational view showing an alternative embodiment of the present invention;

FIG. 22 is a partially sectioned elevational view showing another modified embodiment of the invention for rotating the manipulator arm and actuated mechanism of FIG. 1 about a vertical axis; and FIG. 23 is a sectional view taken substantially along the line 23—23 in FIG. 22.

Figure 2:
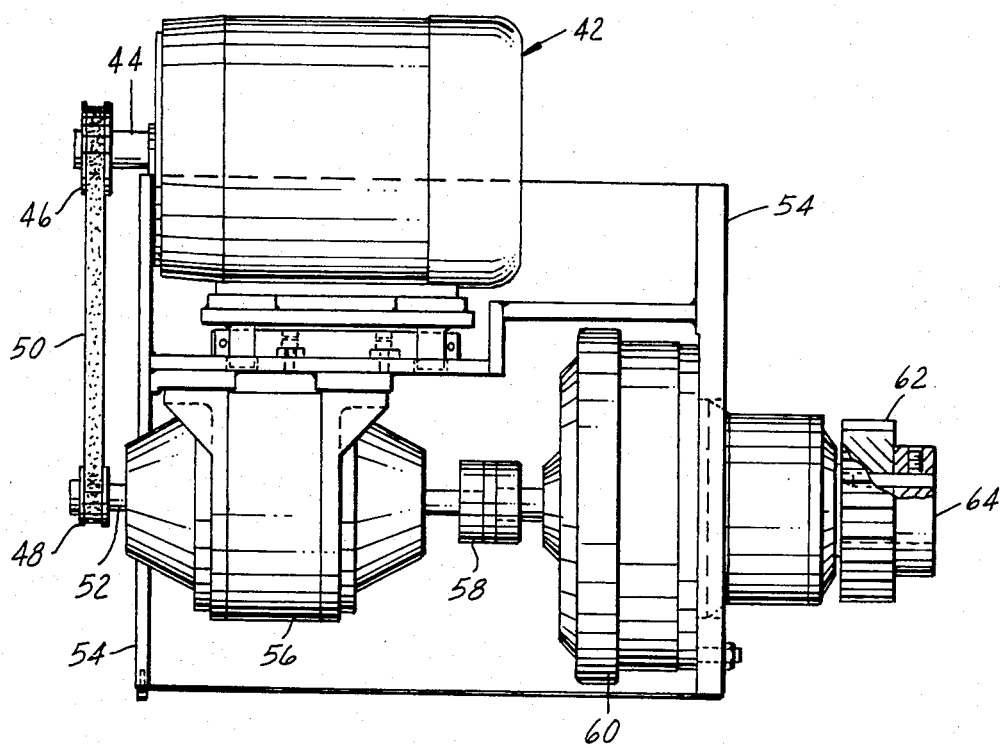
FIG. 2 is a rear elevational view of the system of FIG. 1 taken substantially in the direction of arrow 2 in FIG. 1.

FIGS. 1 and 2 illustrate a presently preferred embodiment 30 of a continuous path robotic manipulator system in accordance with the present invention as comprising a manipulator arm 32 mounted on and driven by a manipulator actuatihg mechanism 34. Arm 32 is a three-section articulated manipulator arm comprising a first or upper arm section 36 pivotally mounted at one end to actuator mechanism 34, a second or forearm section 38 pivotally carried at the support-remote end of arm section 36 and a third or hand manipulator segment 40 pivotally carried at the free end of forearm section 38. Each arm section is mounted to the next-adjacent arm section or support to rotate about spaced parallel axes. The means by which the output of actuator mechanism 34 is transmitted to each of the various manipulator arm sections 36,38,40 will be described in detail hereinafter. In the following description and claims, directional adjectives such as "upper" or "horizontal" are taken with reference to the manipulator orientation shown in FIG. 1 wherein the manipulator arm segments pivot about horizontal axes in a vertical plane. It will become apparent as the description unfolds, however, that the entire system could be canted or angulated with respect to vertical, could be disposed for motion in the horizontal direction or could be entirely inverted where desired.

Manipulator arm actuator mechanism 34 includes an electrically driven motor 42 having an output shaft 44 coupled by the pulleys 46,48 and a V-belt 50 (FIG. 2) to a drive shaft 52. Motor 42 is fixedly mounted on the actuator support structure 54 and is electrically connected in the usual manner to controlled motor drive circuitry, etc. not shown. Drive shaft 52 is coupled through an electrically controlled clutch/brake mechanism 56, a coupling 58 and a gear reducer assembly 60 so as to rotate an actuator drive gear 62 as a controlled function of rotation at motor 42. During normal operation, motor 42 is operated continuously, and drive gear 42 may be operated continuously or intermittently as desired and controlled by clutch/brake mechanism 56. Gear 62 is held on drive shaft 52 by the keyed collar 64. As best seen in FIG. 1, drive gear 62 is coupled by an idler gear 66 to a gear 68 secured to a rotatable camshaft 70, which provides the basic input to actuator mechanism 34 as will be described. Gears 66,68 are held on the corresponding shafts by the collars 67,69.

Figure 3:
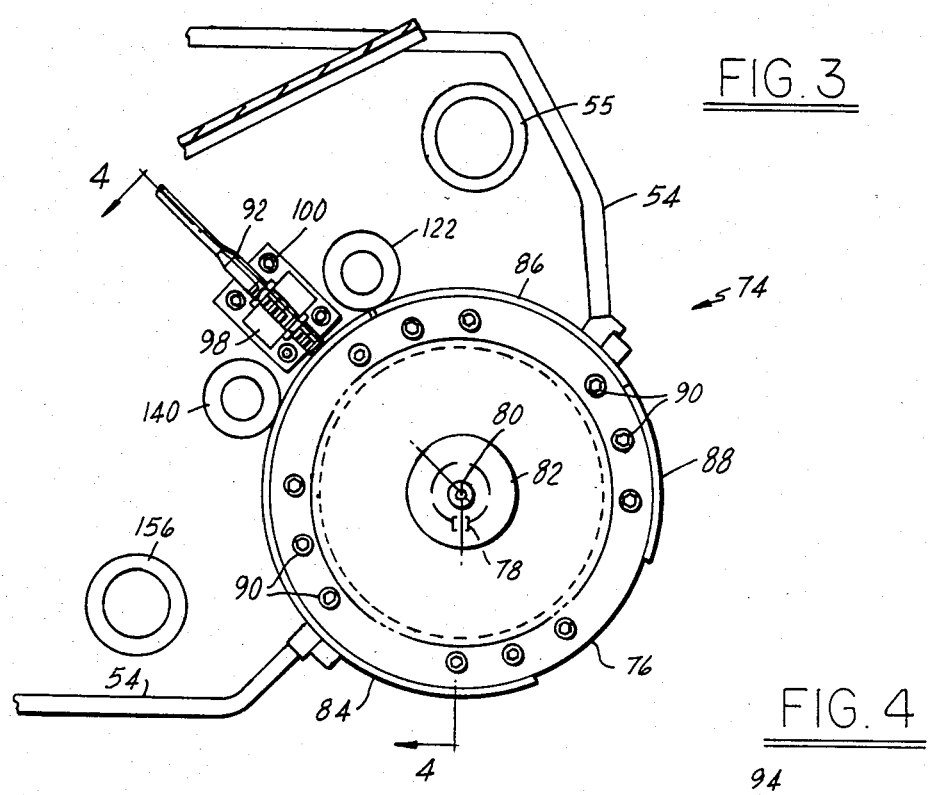
FIG. 3 is a fragmentary side elevational view taken substantially in the direction of line 3—3 in FIG. 10 showing the manipulator position monitoring apparatus in accordance with the present invention.
Figure 16:
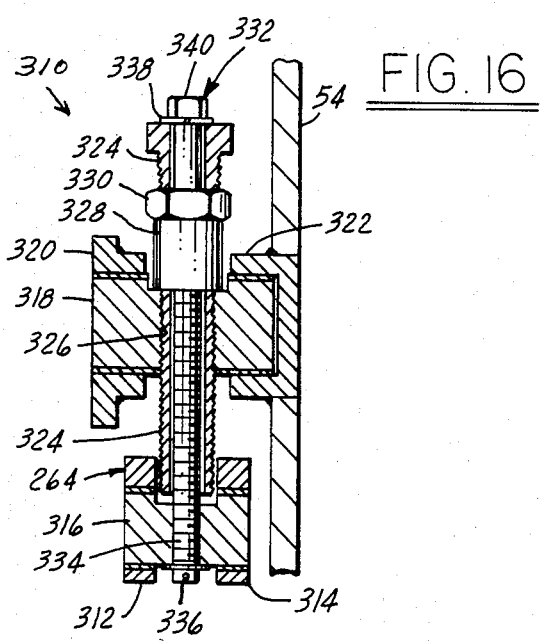
FIGS. 14–16 are sectional views taken substantially along the respective lines 14—14, 15—15 and 16—16 in FIG. 5.
Figure 4:
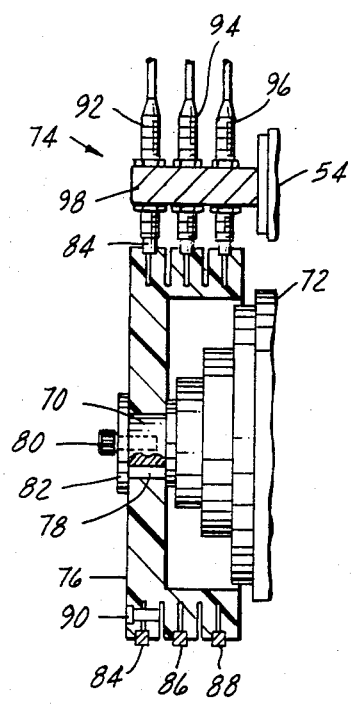
FIG. 4 is a sectional view taken substantially along the line 4—4 in FIG. 3.
Figure 5:
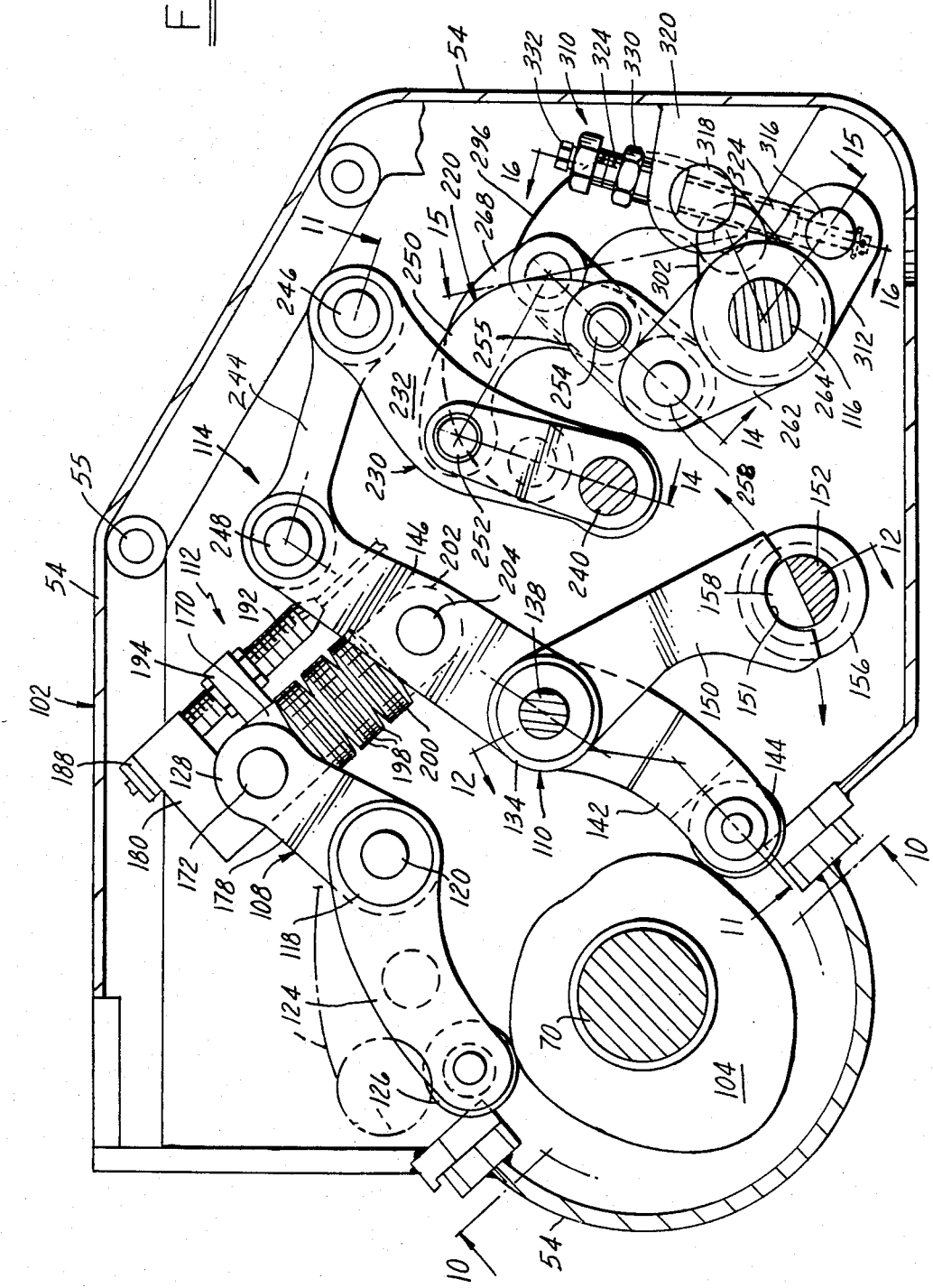
FIG. 5 is a side elevational view of the system of FIG. 1 with housing side panel removed to expose one portion of the cam-operated manipulator actuating mechanism in accordance with the present invention.

As shown in FIG. 10, camshaft 70 is journalled on the support structure or housing 54 by the bearings 72 and extends through the housing. A camshaft position encoder 74 is mounted on the gear-remote end of camshaft 70. Referring in particular to FIGS. 3 and 4, camshaft position encoder 74 includes a hollow plastic drum 76 secured by a key 78 to rotate with camshaft 70 and held thereon by the screw 80 and the washer 82. Part-annular segments 84,86,88 of ferromagnetic material are mounted in corresponding radially facing slots in the periphery of drum 76 and are clamped therein by suitable screws 90 threaded axially into the drum body. Proximity switches 92,94,96 are mounted on a bracket 98 affixed by screws 100 (FIG. 3) externally on support housing 54 and are positioned with respect to camshaft 70 so as to be responsive to passage of part-annular segments 84,86,88 respectively as camshaft 70 rotates. Proximity switches 92,94,96, which are of conventional construction, may be connected to suitable control electronics (not shown) for monitoring camshaft position. Segments 84,86,88 may be of any suitable arcuate length for indicating specific camshaft positions in any desired manner. More or fewer segments 84,86,88 and more or fewer switches 92,94,96 may be used depending upon the number of camshaft positions to be detected during each revolution.

Internally of support structure 54, manipulator actuator mechanism 34 comprises three four-bar linkage actuator mechanisms driven by cams mounted on camshaft 70 for independent controlled actuation of manipulator arm segments 36,38,40 respectively. The three four-bar linkage mechanisms are substantially identical in assembly and operation. The linkage mechanism for controlling motion of manipulator hand section 40 (FIG. 1) will be described in detail in connection with the application drawings. Corresponding elements for actuation of manipulator upper arm section 36 and forearm section 38 are designated by correspondingly identical reference numerals in the application drawings followed by the suffix "a" and "b" respectively.

Referring to FIGS. 5-8 and 10, actuator 102 for driving manipulator hand section 40 includes a pair of conjugate cams 104,106 mounted to rotate with camshaft 70. A pair of cam followers 108,110 are mounted to pivot as a function of corresponding cams 104,106 and are biased for engagement therewith by an overload mechanism generally indicated at 112. Cam follower 110 is coupled to a four-bar linkage mechanism generally indicated at 114 to transmit and amplify motion of follower 110 to the axis of an output shaft 116, and thence to manipulator hand section 40. It will be understood in the following description that each of the pivotal connections between the various linkages in four-bar linkage mechanism 114 includes a bushing disposed between the mutually pivotable members, and thrust washers or bearings where appropriate. These bushings and washers are illustrated in the drawings and are all of conventional construction. The support structure indicated by the general reference numeral 54 essentially comprises a housing or enclosure divided into three laterally adjacent sections and held in assembly by the tie rods 55. Actuator mechanism 102 is disposed in the farthest section as viewed in FIG. 1, which is the left-hand section as viewed in FIG. 10. Corresponding actuators 102a and 102b are disposed in the central and other outside sections respectively.

Figure 11:
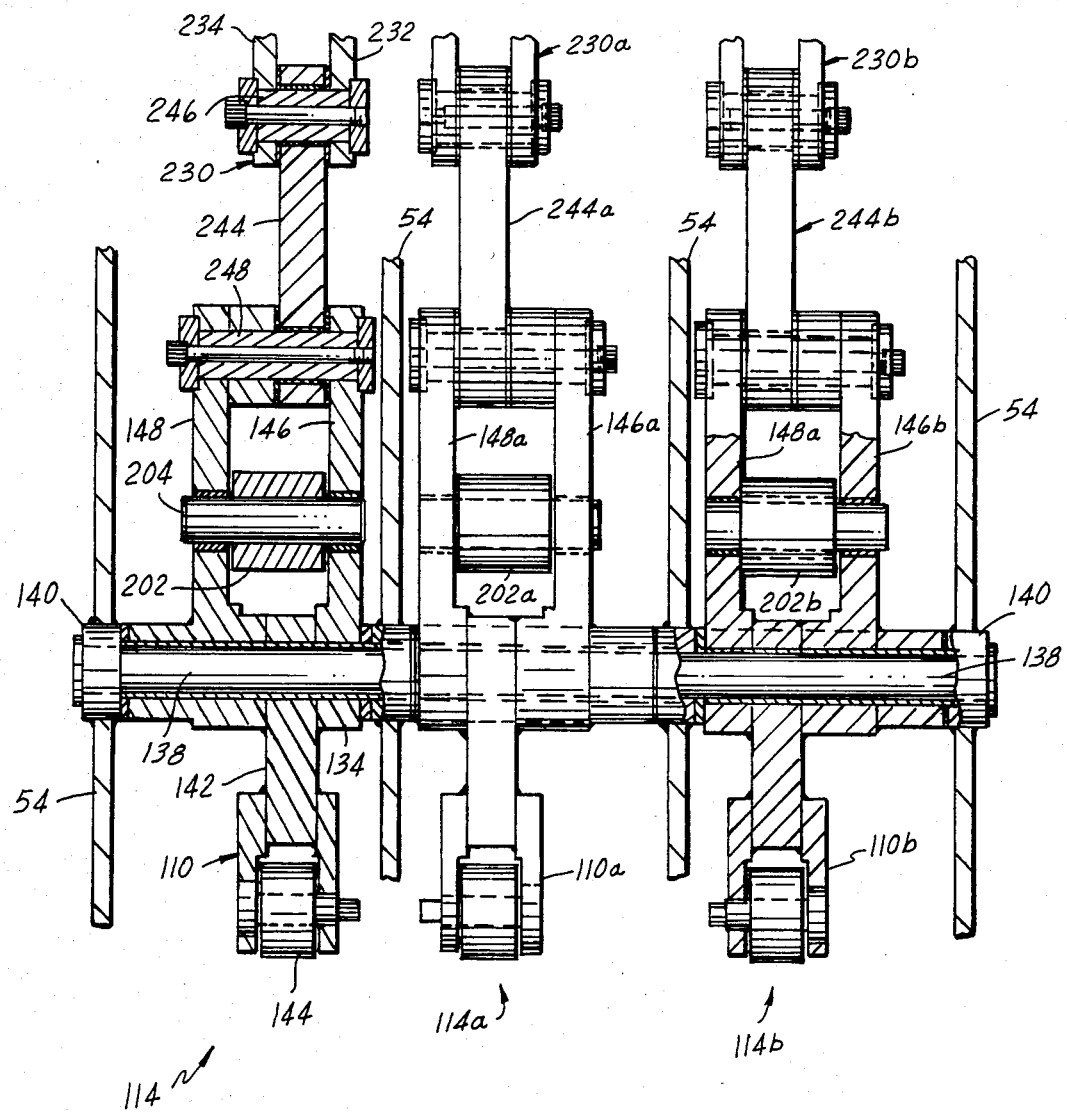

More specifically, follower 108 comprises a bell crank having a central collar 118 mounted to pivot about a fixed shaft 120 which extends entirely across support structure 54 and is carried in the hollow bosses 122 (FIG. 1) on the housing side walls, followers 108a and 108b (FIG. 10) being pivotable on the same shaft. An arm 124 projects integrally downwardly from collar 118 and terminates in a roller 126 for engaging the periphery of cam 104. A pair of spaced parallel arms 128,130 project upwardly from collar 118 to engage the biasing and overload mechanism 112 in a manner to be described. Follower 110 is also in the form of a bell crank having a central collar 134 pivotally mounted to rotate on a fixed shaft 138 which extends entirely across housing 54 and is mounted thereto within the hollow bosses 140 (FIGS. 1 and 11) on the housing side walls. Followers 110a and 110b (FIGS. 10 and 11) also pivot on shaft 138. A leg 142 projects integrally downwardly from collar 134 and has a roller 144 rotatably mounted on the free end thereof for engagement with the peripheral surface of cam 106. A pair of arms 146,148 project integrally upwardly from collar 134. Overload mechanism 112 is coupled to legs 146,148 in the manner to be described. Thus, followers 108,110 pivot about respective shafts 120,138 as corresponding functions of cams 104,106. As previously indicated, cams 104,106 are so-called conjugate cams, so that motions of followers 108,110 are identical in extent and direction.

An arm 150 (FIGS. 5, 6 and 12) integrally projects from bell crank collar 134 and is engageable with a manually rotatable shaft 152 (FIGS. 1, 5–6 and 12–13) for locking follower 110 against rotation, so as to permit axial withdrawal of camshaft 70 and cams 104,106, etc. from the actuator mechanism. More specifically, shaft 152 is rotatably mounted by the bushings 154 (FIG. 12) within a hollow boss 156 projecting from each side wall of support structure 54, and extends entirely across actuator 34. Shaft 152 has axially spaced radially facing aligned slots 158,158a and 158b machined therein for respective radial alignment through openings 160 in collar 156 with corresponding arms 150,150a and 150b. A semicircular detent 151 is formed in the collar-remote end of arm 150. A flat rectangular lug 162 integrally projects from one end of shaft 152. Lug 162 is of a configuration suitable for gripping by a wrench or the like. A latch 164 is normally affixed to boss 156, as by the screw 166, so that a flat edge of the latch cooperates as shown in FIG. 13 with rectangular lug 162 to prevent rotation of shaft 152. Normally, therefore, arm 150 is free to pivot about shaft 138, with the shaft-remote end of arm 150 swinging through the slot 158 in shaft 152 aligned therewith. If latch 164 is removed and shaft 152 rotated 180°, the slot 158 is rotated away from arm 150, and the semi-circular detent 151 in the end thereof is held by the opposing surface of shaft 152. Thus, arm 150, and therefore follower 110, is locked against rotation about shaft 138 and cams 104,106 may be removed.

Figure 9:
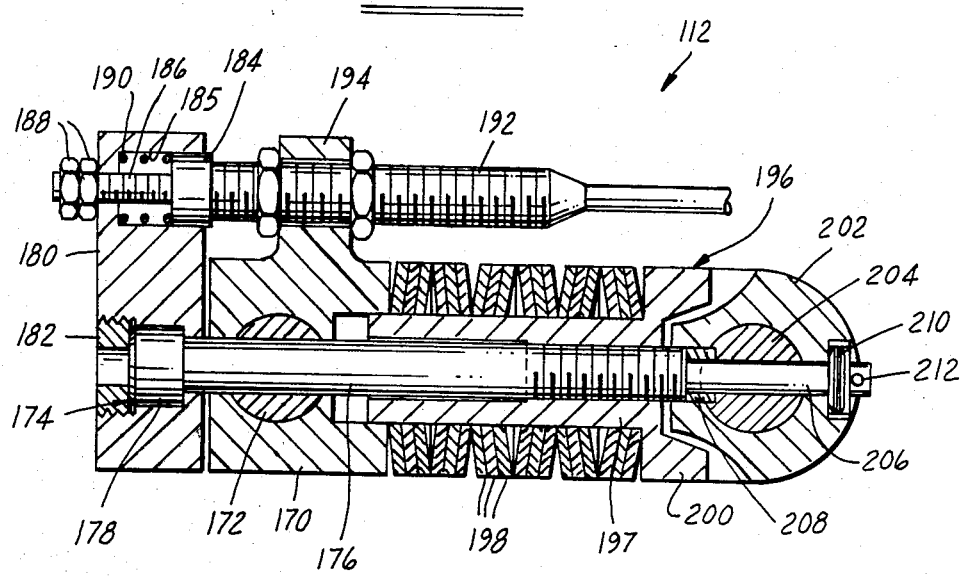
FIG. 9 is a sectional view taken substantially along the line 9—9 in FIG. 6.

Overload mechanism 112 (FIGS. 5, 6 and 9) includes a block 170 mounted by a pin 172 to freely rotate between legs 128,130 of bell crank 108. A bolt 174 has a shank 176 slidably received through aligned openings in block 170 and pin 172. The head 178 of bolt 174 is received within a counterbored opening in a block 180 and firmly retained therein by the externally threaded retaining collar 182. Thus, block 180 is slidably mounted with respect to block 170 by the shank 176 of bolt 174. A slug 184 of ferromagnetic material is received within a stepped opening 185 in block 180 on an axis parallel to and spaced from the axis of bolt 174. A threaded stud 186 integrally projects from slug 184 to receive the jam nuts 188 externally of block 180 for retaining slug 184 within stepped opening 185. A coil spring 190 in opening 185 urges slug 184 outwardly toward an adjustable limit defined by abutment of nuts 188 against the opposing external surface of block 180. A proximity switch 192 of conventional type is mounted on a ledge 194 projecting from block 170 in axial alignment with slug 184.

Bolt shank 176 is threaded into a nut 196 which comprises an internally threaded collar 197 and a flared head 200. A plurality of bellville spring washers 198 are captured in compression on collar 197 of nut 196 between head 200 and an opposing surface of block 170. A block 202 is mounted by a pin 204 to freely rotate between legs 146,148 of bell crank 110. The ensmalled shank end 206 of bolt 174 is slidably received through a spacer 208, and then through aligned openings in pin 204 and block 202, and is affixed to pin 204 and block 202 by the spacer washers 210 and by the retaining key or pin 212. It will thus be appreciated that block 180 is rigidly coupled by bolt 174 and locking collar 182 to block 202, and thence by pin 204 to cam follower 110. Nut 196 is likewise adjustably but rigidly coupled to cam follower 110 by means of threaded engagement with bolt 174. On the other hand, block 170 is coupled by pin 172 to cam follower 110. Thus, bellville springs 198 function to urge or bias the cam-remote ends of followers 108,110 away from each other, and thereby to urge the cam-following rollers 126,144 into operative engagement with the opposing surfaces of cams 104,106. The spring bias on the cam followers may be adjusted by loosening collar 182 and rotating bolt 174 so as to increase or decrease compression of bellville springs 198 as desired.

Overload mechanism 112 also functions to detect interference with motion of manipulator arm 32 (FIG. 1). More specifically, blocks 170,202 are normally urged away from each other by springs 198 as previously described, and blocks 180,170 are therefore urged together such that proximity switch 192 abuts slug 184. Spring 190 permits limited travel of slug 184 following abutment with the opposing foreward end of proximity switch 192 to prevent damage to the latter. In the event that motion of manipulator arm 32 is obstructed or impeded, such obstruction operates through linkage 114 (FIGS. 5 and 6) to hold follower 110 in position. In the meantime, continued rotation of cams 104,106 tends to pivot followers 108,110, such that the relative positions of followers 108,110 to each other are changed. When the cam-remote ends of followers 108,110 move toward each other, such motion compresses bellville springs 198 and separates blocks 170,180. Increasing separation eventually removes slug 184 from proximity to switch 192, whereby switch 192 indicates to appropriate control circuitry (not shown) that an obstruction has been encountered and that clutch/brake 56 (FIG. 2) should be activated in a braking mode to prevent damage to the actuating mechanism.

Figure 14:
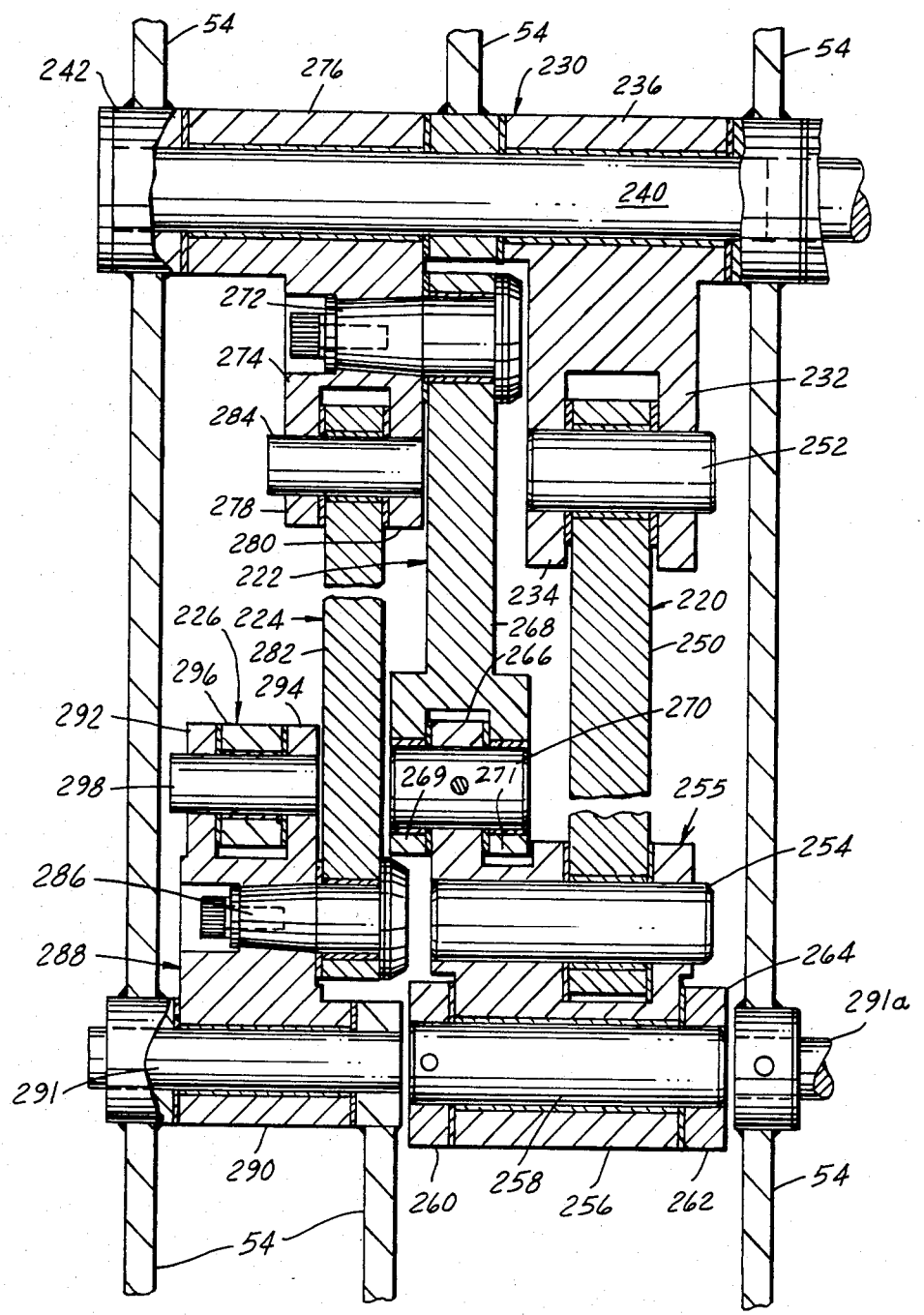
Figure 15:
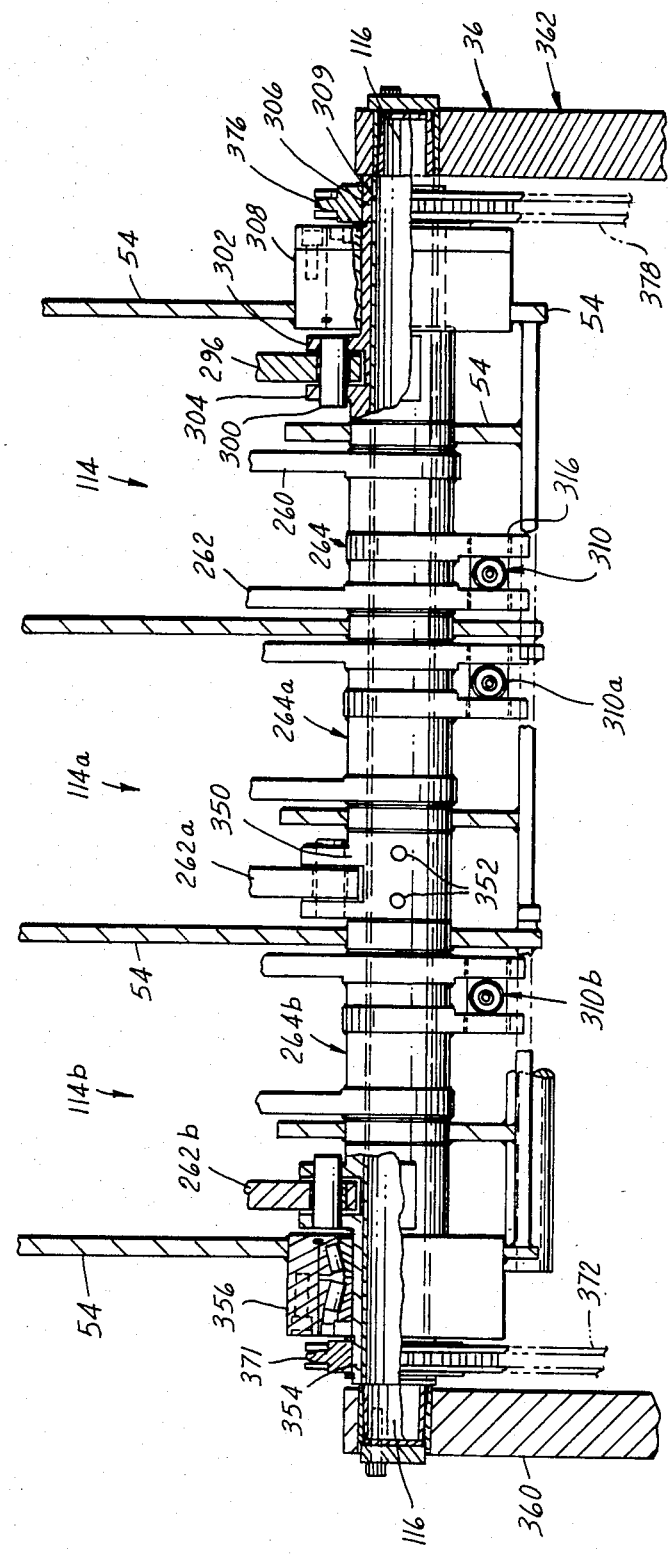

Four-bar linkage mechanism 114 includes first, second, third and fourth four-bar linkages, generally indicated at 220,222,224 and 226 respectively (FIGS. 5-8 and 14-15), which are effectively connected in series to amplify motion of follower 110 to a rotational output about the axis of shaft 116. More specifically, four-bar linkage 220 (FIGS. 5-8 and 14) includes a first bar 230 comprising a pair of spaced parallel arms 232,234 integrally projecting from a collar 236 which is mounted to rotate about a fixed shaft 240. Shaft 240 extends entirely across support structure 54 to pivotally support the bars (not shown) in mechanisms 114a,114b corresponding to bar 230, and has ends carried by the hollow bosses 242 in the support structure side walls (FIGS. 1 and 14). A link 244 is rotatably mounted at one end by a pin 246 between arms 232,234 at the collar-remote end of bar 230. The opposite end of link 244 is rotatably mounted by a pin 248 between legs 146,148 of follower 110 to provide the cam input to mechanism 114.

An arcuate bar 250, comprising the second bar of four-bar linkage 220, is pivotally mounted by a pin 252 to bar 230 between legs 232 and 234 intermediate collar 236 and pin 246. The second end of bar 250 is pivotally mounted by a pin 254 to a third bar 255 of four-bar linkage 250. Bar 255 comprises a pair of fingers projecting integrally from a collar 256 which is rotatably mounted by a pin 258 between a pair of spaced fingers 260,262. Fingers 260,262 form one arm of a bell crank 264 which is mounted for rotation about shaft 116. The axis of shaft 116 is held in fixed position with respect to support structure 54 as will be described. A first bar of second four-bar linkage 222 comprises a finger 266 (FIGS. 6-8 and 14) projecting integrally from collar 256. A second link 268 is pivotally mounted by integral fingers 269,271 and a pivot pin 270 to the collar-remote end of link 266, the distance between the axes of pins 270,258 being greater than the distance between the axes of pins 270,254. The opposing end of link 268 is rotatably coupled by a taper pin 272 to a bar 274. Bar 274, which comprises both the fourth bar of four-bar linkage 222 and the first bar of four-bar linkage 224, projects integrally from a collar 276 which is rotatably mounted on fixed shaft 240 previously described, corresponding collars (not shown) in mechanisms 114a,114b being similarly mounted.

Bar 274 terminates remotely of collar 276 in a pair of spaced fingers 278,280 (FIGS. 6-7 and 14), between which a link 282 is rotatably mounted by the pin 284. Link 282, which is the second bar of four-bar linkage 224, extends and is coupled by the taper pin 286 to a bar 288. The distance between the axis of pin 284 and shaft 240 is greater than the distance between shaft 240 and pin 272. Bar 288, which is both the third bar of four-bar linkage 224 and the first bar of four-bar linkage 226, integrally projects from a collar 290 which is rotatably mounted to support structure 54 by the fixed pin 291. The corresponding collars (not shown) of mechanisms 114a and 114b are likewise mounted on pins fixedly coaxial with pin 291. Bar 288 terminates in a pair of spaced fingers 292,294, between which one end of an arcuate link 296 is pivotally mounted by the pin 298. Arcuate bar 296, which is the second bar of four-bar linkage 226, is pivotally mounted by a pin 300 between a pair of fingers 302,304 integrally projecting from a hollow spindle 306, which is itself rotatably carried with respect to support structure 54 by the roller bearing assembly 308. Output shaft 116 is rotatably mounted by the bushings 309 within spindle 306. The pivotal axes of connections hereinabove described are parallel to each other and to camshaft 70.

Figure 17:
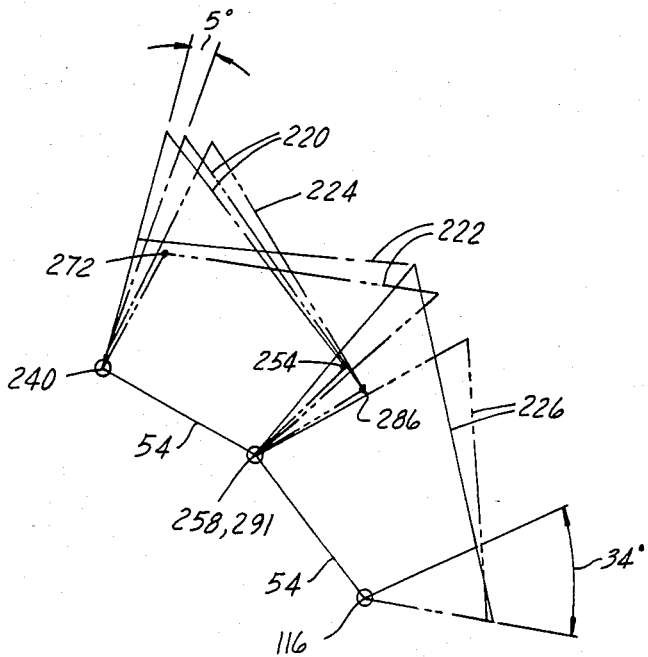
FIGS. 17 and 18 are schematic illustrations useful in understanding operation of the manipulator actuating mechanism in accordance with the present invention.

Before proceeding further, operation of four-bar linkage mechanism 114 will be discussed in connection with the schematic illustration of FIG. 17. It will be appreciated first of all that the "fourth bar" of each four-bar linkage is effectively defined by support structure 54 through shafts 240 and 116 fixedly carried by the support structure, pin 290 fixedly carried by the support structure, and pin 258 mounted on bell crank 264 which is itself carried by shaft 116. Angular rotation of input bar 230, under control of cam follower 110 and link 244, is progressively amplified by four-bar linkages 220 through 226 due to the fact that the output of each four-bar linkage is effectively connected closer to the corresponding rotational axis than is the second bar of the next-successive linkage. Thus, an input to the four-bar linkage arrangement amounting to rotation of 5° at bar 230 results in a 34° rotation about the axis of shaft 116.

An adjustment mechanism illustrated generally at 310 (FIGS. 5, 6, 15 and 16) is coupled to bell crank 264 for adjusting the position of the pivotal connection between four-bar linkages 220 and 222, and thereby adjusting the output rotation angle for a given rotational input. More specifically, bell crank 264, which is rotatable about the axis of output shaft 116 (FIG. 15), has a pair of fingers 312,314 projecting radially therefrom to rotatably receive a pin 316 extending therebetween. A second pin 318 is rotatably mounted within a pair of fingers 320,322 integrally projecting from support structure 54 so as to provide a fixed base for adjustment of bell crank 264. A hollow externally threaded sleeve 324 is threadably received within a corresponding opening 326 extending diametrically through pin 318. A collar 328 and a jam nut 330 are received externally of sleeve 324 for effectively locking sleeve 324 with respect to pin 318. A bolt 332 extends axially and telescopically through the interior of sleeve 324, and is threadably received at the head-remote end thereof within an opening 334 extending diametrically through pin 316. Bolt 332 is captured in assembled position as described by means of a pin 336 extending diametrically therethrough remotely of pin 318. A lock washer 338 is positioned beneath the head 340 of bolt 332.

Figure 18:
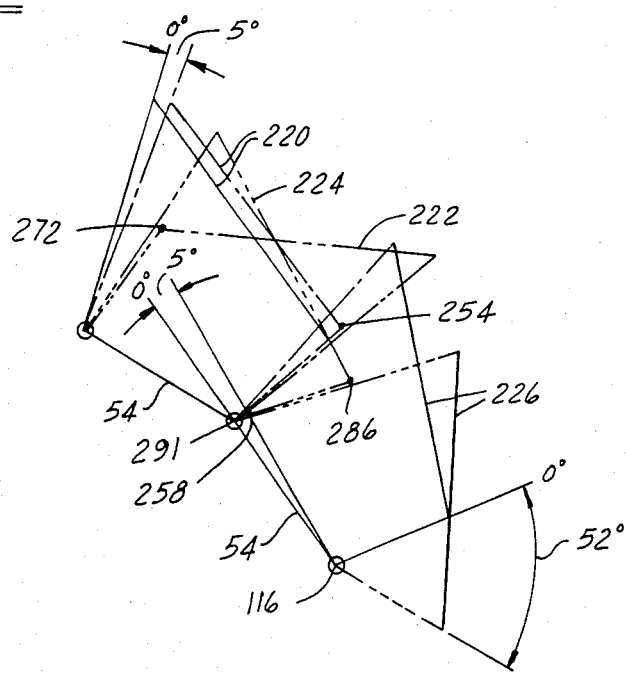
Figure 19:
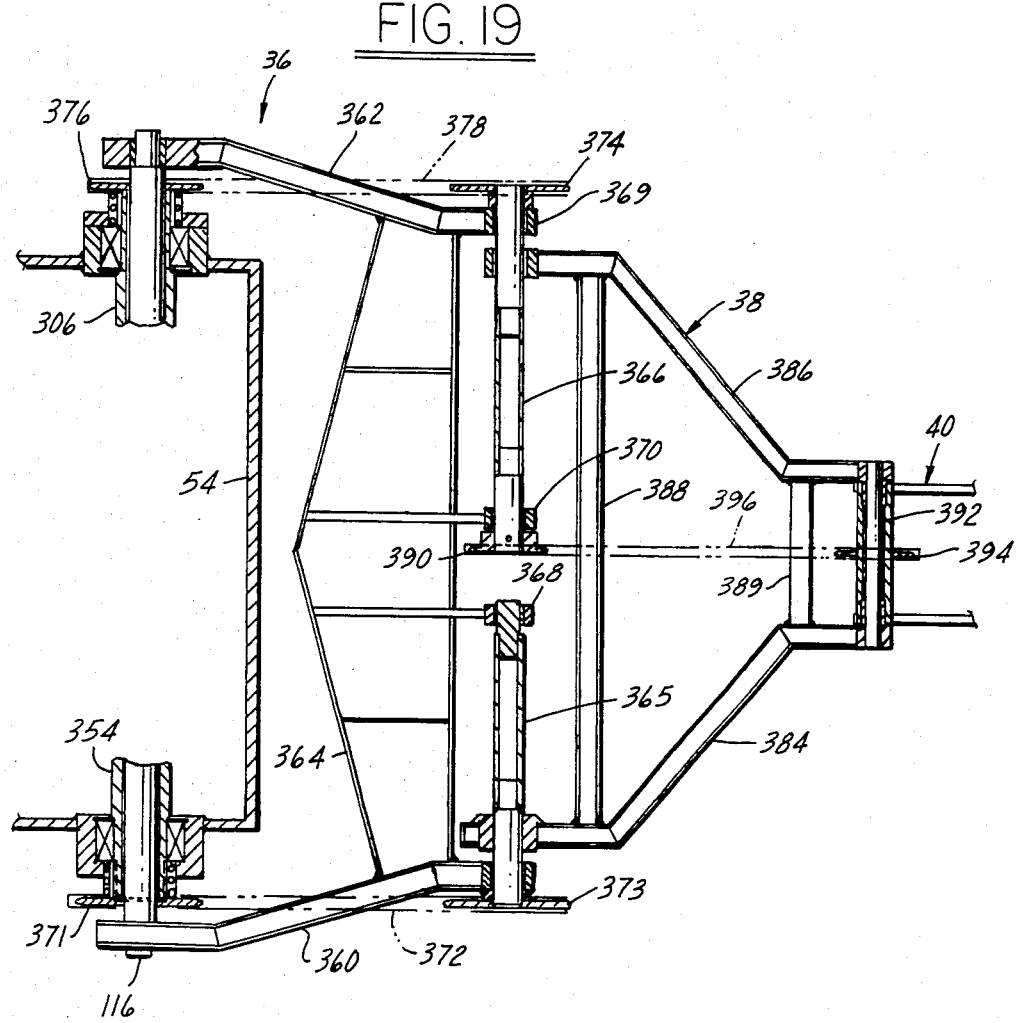
FIG. 19 is a partially sectioned plan view of the manipulator arm illustrated in FIG. 1.

To adjust the angular position of bell crank 264 on shaft 116 and thereby "fine tune" amplification of four-bar linkage arrangement 114, sleeve 324 and bolt 332 are adjustably positioned in pins 318 and 316 respectively so as to vary the distance between the respective pin axes. The effect of such adjustment, which operates through bell crank 264 to vary the pivot point of the connection between four-bar linkages 220 and 222, is illustrated schematically in FIG. 18. That is, a 5° clockwise adjustment of the angle of bell crank 264 about the axis of shaft 116, which effectively moves the interlinkage pivot pin 258 out of nominal axial alignment with pin 290 (FIG. 14), results in an 18° increase in output angle of rotation for a 5° input, as compared with the nominal operation illustrated in FIG. 16.

Thus, spindle 306 (FIG. 15) provides an output in units of angular rotation corresponding to an input to four-bar linkage mechanism 114 from cams 104,106. Likewise, four-bar linkage mechanism 114a (FIG. 15) provides an output angular rotation to a sleeve 350 as a function of input from cams 104a,106a (FIG. 10). Sleeve 350 is telescopically received over shaft 116 and is rotationally secured thereto by the pins 352. Thus, shaft 116 rotates as a function of controlled input from cams 104a and 106a. Likewise, a spindle 354 is rotatably mounted to support 54 by bearings 356 and is coupled to four-bar linkage mechanism 114b so as to provide externally of support structure 54 an output rotation as a function of controlled input from cams 104b and 106b (FIG. 10). Thus, four-bar linkage mechanisms 114, 114a and 114b operate in accordance with one important aspect of the invention to provide three independently variable degrees of motion for use to control movement of the corresponding sections of manipulator arm 32 (FIG. 1).

Referring now to FIGS. 1, 15, 19 and 20, upper arm section 36 of manipulator arm 32 comprises a pair of spaced coplanar arm segments 360,362 of hollow rectangular cross section and interconnected by a brace 364. Output shaft 116, which projects outwardly of spindles 306,354 on opposing sides of support structure 54, is rotationally secured to upper arm sections 360,362 so as to control rotation thereof about the axis of shaft 116. Arm segments 360,362 angle toward each other outwardly of shaft 116. A pair of axially aligned shafts 365,366 are independently and rotatably carried at the free ends of arm segments 360,362 respectively. Each shaft 365,366 is supported between associated arm segments 360,362 and a corresponding bearing block 368,370 carried by brace 364. A sprocket 371 is mounted on and rotatably coupled to spindle 354, and is connected by a drive chain 372 to a sprocket 373 carried by shaft 365 externally of arm segment 360. Likewise, a sprocket 374 is carried by shaft 366 externally of arm segment 362 and is coupled to a sprocket 376 carried on spindle 306 by the chain 378.

Forearm 38 comprises a pair of coplanar forearm sections 384,386 of hollow rectangular cross section interconnected by braces 388,389. Forearm section 384 is rotationally coupled to shaft 365 internally of upper arm section 360. Forearm section 386 is rotatably carried by shaft 366 internally of upper arm section 360. Thus, angular motion of forearm 38 about the aligned axes of shafts 365,366 is controlled by shaft 365, which in turn is controlled by sprockets 371,373, chain 372 and spindle 354. A sprocket 390 is secured to shaft 366 between bearing blocks 369,370. A shaft 392 is rotatably carried between the free ends of forearm sections 384,386, and has secured thereto a sprocket 394 which is coupled by a chain 396 to sprocket 390. The hand section 40 is secured to shaft 392, such that angular motion thereof about the axis of shaft 392 is effectively controlled by sprockets 390,394 and chain 396, which in turn is controlled by shaft 366, sprockets 374,376, chain 378 and spindle 306. Chains 372,396 (and chain 378) include suitable turnbuckles 398 for adjustment as desired.

It will thus be appreciated that one four-bar linkage arrangement cooperates with one pair of conjugate cams to control each degree of movement of the manipulator arm in accordance with the present invention. In the particular embodiment herein disclosed, a three-section manipulator arm requires three degrees of controlled motion, and thus three four-bar linkage mechanisms and three pairs of conjugate cams. Where more or fewer degrees of motion of the manipulator are contemplated, a greater or lesser number of linkage mechanisms and cams, etc. may be provided. Additional telescoping output spindles and/or split output shafts may be employed where four or more degrees of motion are required.

It is sometimes necessary or desirable in applications of manipulator robot arms in accordance with conventional practice that the robot support structure be rotatable about a vertical axis so as to extend the area of coverage of the manipulator mechanism from two to three dimensions. FIGS. 22 and 23 illustrate a modification of the present invention for accomplishing such additional degree of movement. More specifically, a gear 400 is mounted on output shaft 116' and coupled to a second gear 402. A shaft 404 projects from gear 402 through support base 406 to drive a bevelled gear 408. A second bevel gear 410 coupled to gear 408 is connected to a shaft 412. Shaft 412 is affixed to ground as at 414, such that angular rotation at output shaft 116' operates through gears 400, 402, 408 and 410 to effect rotation of the manipulator base 406 and support structure 54 coupled thereto about a vertical axis with respect to base ground 414.

Figure 20:
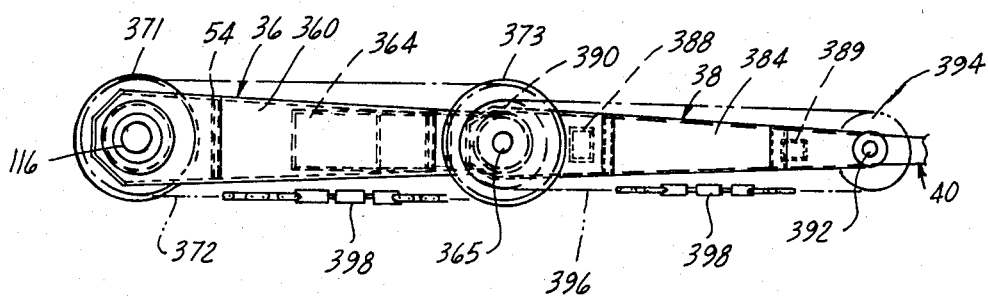
FIG. 20 is a side elevational view of the manipulator arm shown in FIGS. 1 and 19.

Although cam-actuated operation is preferred as hereinabove described, it is also contemplated by the present invention within its broadest aspects that input to follower bell crank 110 may be effected by suitable hydraulic or electromechanical means as illustrated at 416 in FIG. 20. Likewise, it is envisioned that screw adjustment mechanism 310 may be replaced by a hydraulic cylinder dynamically controllable from externally of support 54 for selectively effecting a multiplicity of arm motions using a single cam arrangement. For example, gear reduction may be employed with suitable cams or the like for pivoting bell crank 264 on successive operating cycles to cause hand 40 to move to different work stations on each cycle.

The invention claimed is:

1. A manipulator system comprising support means; a manipulator arm carried by said support means for pivotal movement about at least one axis; four-bar linkage means including a first bar defined between first and second pivot axes disposed at predetermined positions with respect to said support means, second and third bars respectively pivotally mounted at said first and second pivot axes, and a fourth bar pivotally connected to said second and third bars at positions spaced from said first and second axes; drive means coupled to said second bar; means coupling said third bar to said manipulator arm; and means for variably positioning said second axis with respect to said support means for varying amplification between said drive means and said manipulator arm, said variable positioning means comprising a bell crank carried by said support means to pivot about a fixed axis, means pivotally mounting said third bar to one end of said bell crank to define said second axis, and means coupled to the opposite end of said bell crank for pivoting said bell crank with respect to said support means.

2. A manipulator system comprising support means; a manipulator arm carried by said support means for pivotal movement about at least one axis; actuator means carried by said support means for controlling pivotal motion of said manipulator arm about said axis, said actuator means comprising four-bar linkage means including a first bar defined between first and second pivot axes disposed at predetermined positions with respect to said support means, second and third motor for rotating said cam means about a cam axis and cam follower means including a link, means mounting said link to pivot about a fixed axis with respect to said support means, means carried at one end of said link for engaging said cam and means coupling said link to said second bar; and means for locking said four-bar linkage means to permit removal of said cam means including an arm affixed to said link to pivot conjointly with said link about said fixed axis, and means adapted selectively to engage an end of said arm remote from said fixed axis for locking said arm against rotation about said fixed axis.

3. The manipulator system set forth in claim 2 wherein said means adapted for selective engagement comprises a shaft rotatably carried by said support means, means providing a slot in said shaft adjacent said remote end of said arm for normally permitting free movement of said end of said arm through said slot and means adapted to engage said end of said arm upon rotation of said shaft to lock said arm against rotation about said fixed axis.

4. A manipulator system comprising support means; a manipulator arm carried by said support means for pivotal movement about at least one axis; actuator means carried by said support means for controlling pivotal motion of said manipulator arm about said axis, said actuator means comprising four-bar linkage means including a first bar defined between first and second pivot axes disposed at predetermined positions with respect to said support means, second and third bars respectively pivotally mounted at said first and second pivot axes, and a fourth bar pivotally connected to said second and third bars at positions spaced from said first and second axes, means coupling said third bar to said manipulator arm, and drive means comprising cam means, means including a drive motor for rotating said cam means about a cam axis and cam follower means coupling said cam means to said second bar; said cam means comprising conjugate cams mounted for corotation about said cam axis, and said cam follower means comprising first and second bell cranks mounted to pivot about respective fixed axes with respect to said support means, means at one end of each said bell crank for engaging the associated said conjugate cam, and means extending between said bell cranks remotely of said cams for biasing said cam engaging means into engagement with said cams; and means carried by said bell cranks and responsive to variation in position of said bell cranks with respect to each other for indicating obstruction to movement of said four-bar linkage means and said manipulator arm.

5. The manipulator system set forth in claim 4 wherein said obstruction indicating means comprises proximity detection means operatively carried at ends of said bell cranks remote from said cam means.

6. A manipulator system comprising support means; a manipulator arm carried by said support means for pivotal movement about at least one axis and including at least a first arm segment pivotally mounted to said support means and a second arm segment carried by said first arm segment for independent pivotal movement with respect to said first arm segment and said support means; actuator means carried by said support means for controlling pivotal motion of said manipulator arm, said actuator means comprising first and second four-bar linkage means each including a first bar defined between respective first and second pivot axes disposed at predetermined positions with respect to said support means, second and third bars respectively pivotally mounted at said first and second pivot axes, and a fourth bar pivotally connected to said second and third bars at positions spaced from said first and second axes, first and second drive means respectively coupled to the associated said second bar of said first and second four-bar linkage means, said first and second four-bar linkage means being carried by said support means to provide respective first and second outputs on a common axis of rotation; and telescoping first and second output means carried for independent rotation on said common axis for transmitting motion of the said third bars of said first and second four-bar linkage means to said first and second arm segments independently of each other.

7. The manipulator system set forth in claim 6 wherein said transmitting means further comprises means directly coupling the inner of said first and second telescoping means to said first arm segment, and endless drive means extending along said first arm segment and coupling the outer of said telescoping means to said second arm segment.

8. The manipulator system set forth in claim 7 wherein said manipulator arm additionally comprises a third arm segment carried by said second arm segment for independent pivotal movement, wherein said four-bar linkage means comprises third four-bar linkage means carried by said support means, third drive means coupled to said third four-bar linkage means, and means for transmitting motion of said third four-bar linkage means to said third arm segment independently of said first and second arm segments.

9. The manipulator system set forth in claim 8 wherein said third four-bar linkage means is carried by said support means to provide an output on said common axis, and wherein said transmitting means comprises endless drive means extending along said first and second arm segments.

10. The manipulator system set forth in claim 6 wherein all of said drive means comprise corresponding cam means mounted for rotation on a common axis, means for rotating said cam means conjointly and means responsive to each said cam means for controlling operation of a corresponding said four-bar linkage means.

11. A manipulator system comprising support means; a manipulator arm including at least a first arm segment pivotally carried by said support means and a second arm segment carried by said first arm segment for independent pivotal movement with respect to said first arm segment and said support means; first and second four-bar linkage means each including a first bar defined between respective first and second pivot axes disposed at predetermined positions with respect to said support means, second and third bars respectively pivotally mounted at said first and second pivot axes, and a fourth bar pivotally connected to said second and third bars at positions spaced from said first and second axes; means for transmitting motion of each said third bar to a corresponding said arm segment independently of each other; and drive means comprising first and second cam means, means for conjointly rotating said cam means about a common cam axis, and first and second cam follower means respectively coupling each of said cam means to an associated said second bar.

12. The manipulator system set forth in claim 11 wherein each said cam means comprises conjugate cams mounted for corotation about said cam axis; and wherein each said cam follower means comprises first and second bell cranks mounted to pivot about respective fixed axes with respect to said support means, means at one end of each said bell crank for engaging the associated said conjugate cam, and means extending between said bell cranks remotely of said cams for biasing said cam engaging means into engagement with said cams.

13. The manipulator system set forth in claim 12 further comprising means carried by said bell cranks and responsive to variation in position of said bell cranks with respect to each other for indicating obstruction to movement of said four-bar linkage means and said manipulator arm.

14. The manipulator system set forth in claim 11 further comprising means defining at least some common pivot axes between said first and second four-bar linkage means.

15. The manipulator system set forth in claim 14 or 11 wherein said first and second four-bar linkage means are carried by said support means to provide respective first and second outputs on a common axis of rotation, and wherein said transmitting means comprises telescoping first and second output means carried for independent rotation on said common axis.

16. The manipulator system set forth in claim 11 wherein said manipulator arm additionally comprises a third arm segment carried by said second arm segment for independent pivotal movement; and wherein said system further comprises third four-bar linkage means carried by said support means, third cam means coupled for conjoint rotation with said first and second cam means about said common cam axis, third cam follower means coupling said third cam means to said third four-bar linkage means, and means for transmitting motion of said third four-bar linkage means to said third arm segment.

17. The manipulator system set forth in claim 16 wherein said first, second and third four-bar linkage means are carried by said support means to provide respective first, second and third outputs on a common axis of rotation, said transmitting means coupling said outputs to respective ones of said arm segments.

18. The manipulator system set forth in claim 11 further comprising means coupled to each of said four-bar linkage means at one of said first and second axes for individually varying operation of each said four-bar linkage means independently of each other and independently of said drive means.

19. The manipulator system set forth in claim 18 wherein said operation-varying means comprises means for varying position of one of said first and second axes with respect to said support means.

20. The manipulator system set forth in claim 4, 6 or 11 further comprising means mounting said support means for rotation about a vertical axis, and means for controlling rotation of said support means about said vertical axis independently of motion imparted to said manipulator arm.

* * * * *